(12) United States Patent
Leininger (10) Patent No.: US 9,017,435 B2
(45) Date of Patent: Apr. 28, 2015

(54) GASIFIER MONITOR AND CONTROL SYSTEM

(75) Inventor: Thomas Frederick Leininger, Chino Hills, CA (US)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 12/901,391

(22) Filed: Oct. 8, 2010

(65) Prior Publication Data

US 2012/0085028 A1   Apr. 12, 2012

(51) Int. Cl.
| | | |
|---|---|---|
| C10J 1/207 | (2012.01) | |
| B01J 7/00 | (2006.01) | |
| C10J 3/48 | (2006.01) | |
| C10J 3/72 | (2006.01) | |
| G05D 11/13 | (2006.01) | |

(52) U.S. Cl.
CPC *C10J 3/485* (2013.01); *Y02E 20/18* (2013.01); *Y02E 20/16* (2013.01); *C10J 3/723* (2013.01); *C10J 2300/1606* (2013.01); *C10J 2300/1653* (2013.01); *C10J 2300/1678* (2013.01); *C10J 3/726* (2013.01); *G05D 11/135* (2013.01)

(58) Field of Classification Search
USPC ........... 48/61, 127.9, 127.1, 76, 67, 210, 101, 48/86 R
See application file for complete search history.

(56) References Cited

U.S. PATENT DOCUMENTS

| | | | |
|---|---|---|---|
| 3,838,727 A | 10/1974 | Levi et al. | |
| 4,432,286 A | 2/1984 | Witte | |
| 4,850,001 A | 7/1989 | Duysings et al. | |
| 4,969,035 A * | 11/1990 | Dawson | 348/83 |
| 4,981,088 A * | 1/1991 | Burris | 110/193 |
| 5,000,580 A | 3/1991 | Leininger et al. | |
| 5,301,621 A * | 4/1994 | Vassiliou et al. | 110/346 |
| 5,554,202 A | 9/1996 | Brooker et al. | |
| 5,777,668 A * | 7/1998 | Amano | 348/83 |
| 5,777,797 A | 7/1998 | Miyano | |
| 5,831,668 A * | 11/1998 | Hirvonen et al. | 348/83 |
| 5,929,989 A * | 7/1999 | Mori et al. | 356/477 |

(Continued)

FOREIGN PATENT DOCUMENTS

| | | |
|---|---|---|
| CN | 1444724 A | 9/2003 |
| CN | 101448729 A | 6/2009 |

(Continued)

OTHER PUBLICATIONS

Search Report and Written Opinion from corresponding PL Application No. P-396577 dated Jan. 17, 2012.

(Continued)

*Primary Examiner* — Kaity Handal
(74) *Attorney, Agent, or Firm* — Fletcher Yoder, P.C.

(57) ABSTRACT

A system, including a gasifier comprising a wall defining a chamber, an inlet, an outlet, and a port, a combination feed injector coupled to the inlet, wherein the combination feed injector is configured to inject a first fuel and air or oxygen into the chamber to preheat the gasifier, and the combination feed injector is configured to inject a second fuel and oxygen into the gasifier after preheating to gasify the second fuel, an optical device coupled to the port, a sensor coupled to the optical device, and a monitoring system coupled to the sensor, wherein the monitoring system is configured to acquire data from the sensor, process the data, and provide an output representative of a condition of the gasifier based on the data.

23 Claims, 7 Drawing Sheets

(56) References Cited

U.S. PATENT DOCUMENTS

| | | | |
|---|---|---|---|
| 6,325,621 B1* | 12/2001 | Murasaki et al. | 432/250 |
| 6,778,209 B1* | 8/2004 | Eversole et al. | 348/83 |
| 6,806,900 B2* | 10/2004 | Eversole et al. | 348/83 |
| 6,809,811 B2* | 10/2004 | Johnsen et al. | 356/300 |
| 7,489,835 B1* | 2/2009 | Xia et al. | 385/12 |
| 2004/0013777 A1 | 1/2004 | Hallstadius | |
| 2009/0029299 A1* | 1/2009 | Fischer et al. | 431/6 |
| 2009/0178338 A1 | 7/2009 | Leininger et al. | |
| 2009/0199474 A1 | 8/2009 | Leininger et al. | |
| 2009/0202403 A1 | 8/2009 | Jimenez-Huyke et al. | |
| 2010/0146858 A1* | 6/2010 | Zamansky et al. | 48/210 |
| 2012/0137582 A1 | 6/2012 | Graham et al. | |

FOREIGN PATENT DOCUMENTS

| | | |
|---|---|---|
| DE | 4025808 A1 | 1/1991 |
| WO | 2009055829 A1 | 4/2009 |

OTHER PUBLICATIONS

Unofficial English translation of CN Office Action dated Feb. 20, 2014 issued in connection with corresponding CN Application No. 201110315777.3.

* cited by examiner

GASIFIER MONITOR AND CONTROL SYSTEM

BACKGROUND OF THE INVENTION

The subject matter disclosed herein relates to gasifiers, and more particularly to a gasifier sensor and monitor.

IGCC power plants are capable of generating energy from various carbonaceous feedstocks, such as coal or natural gas, relatively cleanly and efficiently. IGCC technology may convert the carbonaceous feedstock into a gaseous mixture of carbon monoxide (CO) and hydrogen ($H_2$), i.e., syngas, by reaction with oxygen and steam in a gasifier. The reactions within the gasifier may create a byproduct referred to as slag. Slag normally runs down the interior wall of a gasifier and ultimately exits the gasifier. At times, the slag may not flow out of the gasifier and may instead collect in the gasifier throat. In order to determine whether slag is blocking the gasifier throat, an operator may need to shut down the gasifier, remove the feed injector, and manually inspect the interior of the gasifier. Unfortunately, the manual inspection results in costly downtime of the gasifier, and is somewhat subjective as it is based on operator experience.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes, a gasifier including a wall defining a chamber, an inlet, an outlet, and a port, a combination feed injector coupled to the inlet, wherein the combination feed injector is configured to inject a first fuel and air into the chamber to preheat the gasifier, and the combination feed injector is configured to inject a second fuel and oxygen into the gasifier after preheating to gasify the second fuel, an optical sensor coupled to the port, and a monitoring system coupled to the optical sensor, wherein the monitoring system is configured to acquire data from the optical sensor, process the data, and provide an output representative of a condition of the gasifier based on the data.

In a second embodiment a system including, a gasifier monitor configured to acquire image data from an optical sensor directed into a chamber of a gasifier, process the image data, and provide an output representative of a condition of the gasifier based on the image data, and a gasifier controller responsive to the output from the gasifier monitor, wherein the gasifier controller is configured to adjust at least one of a fuel flow or an oxygen or an airflow into the gasifier in response to the output.

In a third embodiment, a method, including, obtaining an image of a chamber of a gasifier, and spatially analyzing the image relative to a baseline to identify a wear condition or a slag condition inside the chamber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to internal monitoring and control of a gasifier using an optical device mounted to the gasifier separate from an inlet or feed injector location. For example, an optical device may obtain image data of an interior of the gasifier, e.g., an upstream or downstream portion. The image data may include UV data, IR data, visible light spectrum data, etc. A monitor and control system may then analyze the image to evaluate the internal conditions of the gasifier. For example, the system may determine by interpreting the image data from the optical device whether there is slag buildup or refractory wear in the gasifier. The system may also determine other internal conditions within the gasifier. Furthermore, the system may control the gasification process based upon an analysis of the image data. For example, the system may use the image data to improve a transition from a pre-heat mode to a gasification mode. In certain embodiments, the optical device may be mounted to a wall of the gasifier during operation of the gasifier to enable continuous monitoring and control of the gasifier. In other embodiments, the optical device may be removably disposed in a port in the wall of the gasifier, such that the optical device is used only when image data is desired to analyze the gasifier, e.g., during downtime. In either configuration the optical device enables the system to provide an objective and repeatable standard for analyzing internal conditions of the gasifier without relying solely on operator experience and manual inspection.

Figure 1:
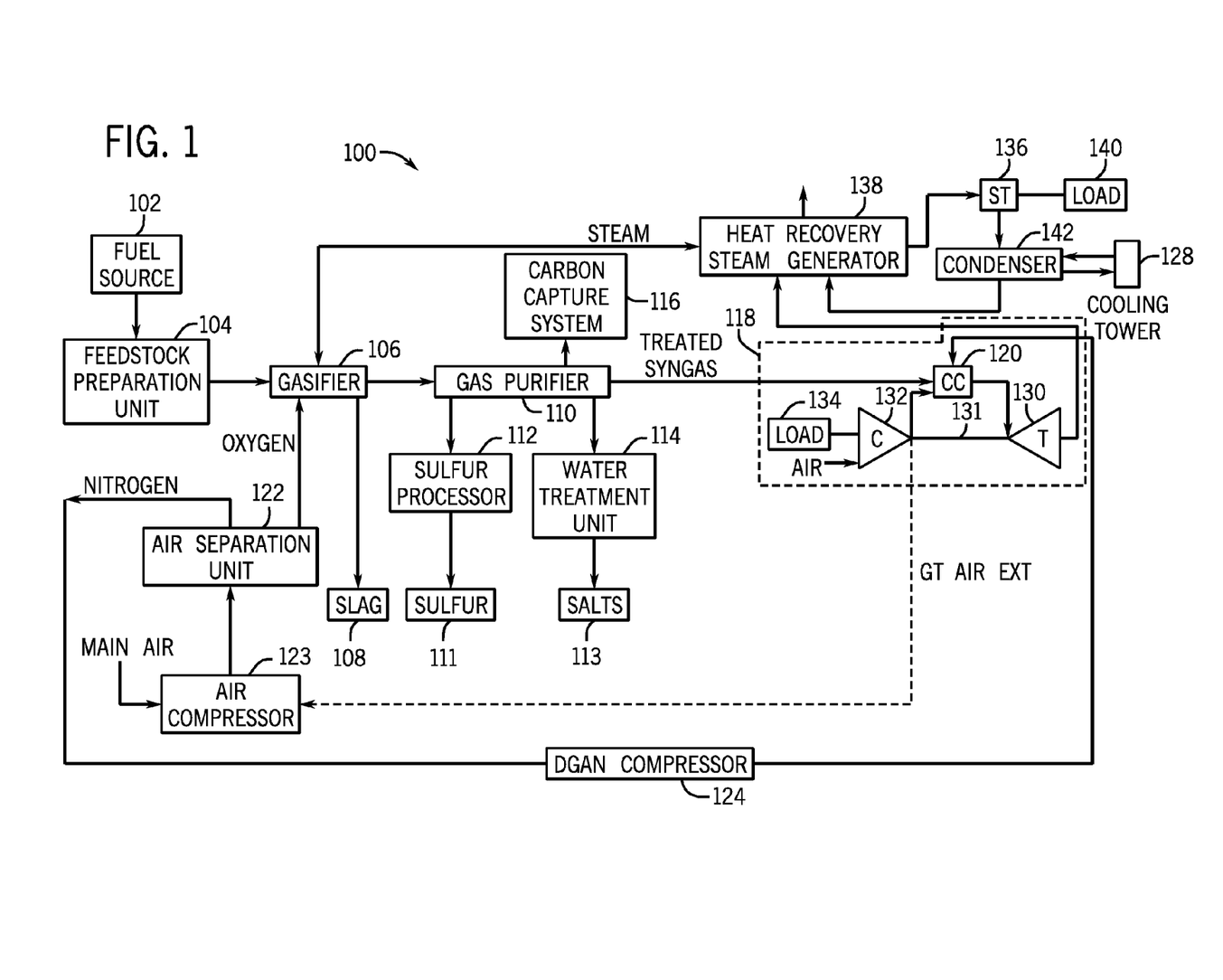
FIG. 1 is a block diagram of an embodiment of an IGCC power plant that may employ an internal monitor and control system for a gasifier.

FIG. 1 is a diagram of an embodiment of an integrated gasification combined cycle (IGCC) system 100 that may include an internal monitoring and control system for a gasifier. As illustrated in FIG. 1, the IGCC system 100 is configured to gasify a feedstock or fuel source 102, drive steam and gas turbines, and generate electricity. The fuel source 102 may include a variety of carbonaceous fuels, such as coal, or hydrocarbons, in a solid or liquid form. A feedstock preparation unit 104 may be included to prepare the fuel for gasification, e.g., by milling, shredding, and pulverizing a solid form of the fuel source 102. However, the feedstock preparation unit 104 may be omitted if the fuel source 102 is in a liquid form.

The feedstock may be passed to a gasifier 106 from the feedstock preparation unit 104. The gasifier 106 may convert the feedstock into a syngas, e.g., a combination of carbon monoxide (CO) and hydrogen. This resultant gas may be termed untreated syngas, because it includes, for example, $H_2S$. The gasifier 106 may also generate byproduct material, such as slag 108, which may be a wet ash material. A gas purifier 110 may be utilized to clean the untreated syngas. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a carbon capture system 116 may remove and process the carbonaceous gas (e.g., carbon dioxide that is approximately 80-100 or 90-100 percent pure by volume) included in the syngas. The carbon capture system 116 also may include a compressor, a purifier, a pipeline that supplies $CO_2$ for sequestration or enhanced oil recovery, a $CO_2$ storage tank, or any combination thereof. The treated syngas, which has undergone the removal of its sulfur containing components and a large fraction of its carbon dioxide, may be then transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally, the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118. The nitrogen may be used as a diluent to facilitate control of emissions, for example.

As described previously, the compressed nitrogen may be transmitted from the DGAN compressor 124 to the combustor 120 of the gas turbine engine 118. The gas turbine engine 118 may include a turbine 130, a drive shaft 131, and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases force turbine blades in the turbine 130 to rotate the drive shaft 131 along an axis of the gas turbine engine 118. The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. The drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first 134 and second 140 loads may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems, such as the IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 power generation cycle is often referred to as the "topping cycle," whereas the steam turbine engine 136 power generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
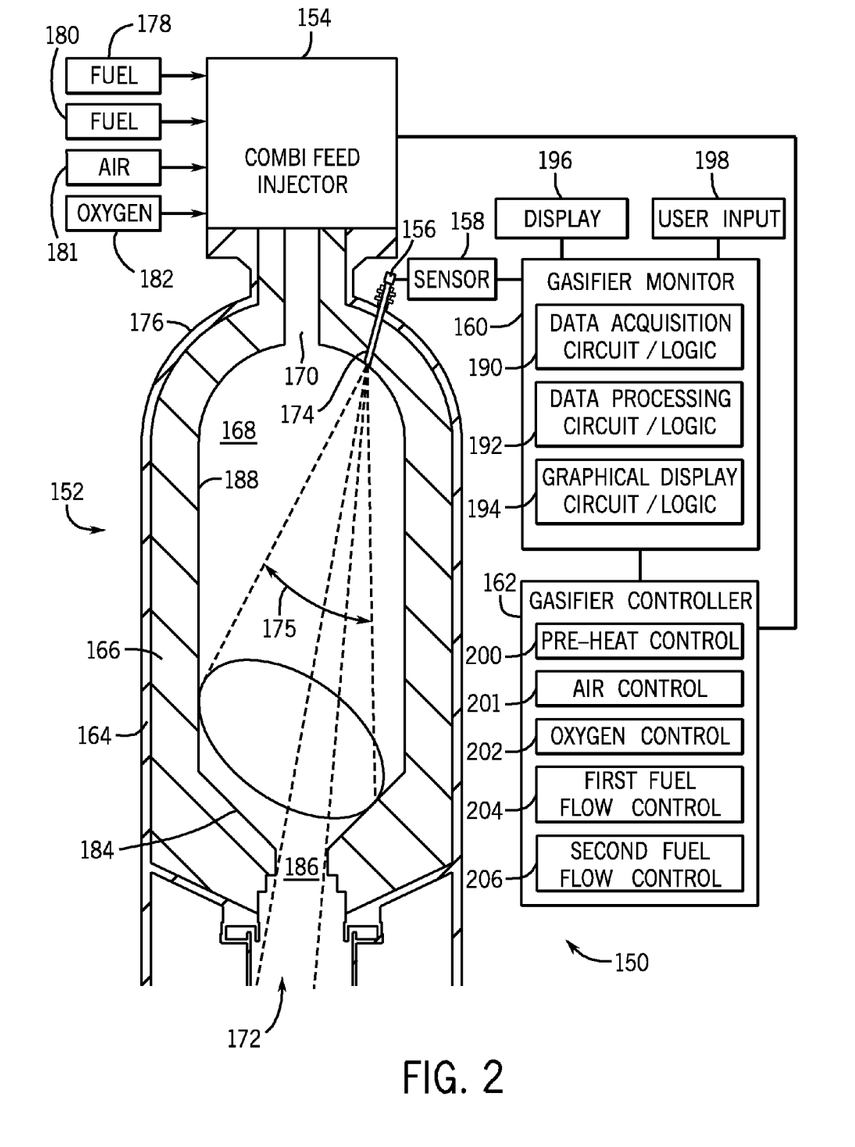
FIG. 2 is a cross-sectional view of an embodiment of a gasifier with a system for internally monitoring and controlling the gasifier.

FIG. 2 is a cross-sectional view of a system 150 for internally monitoring and controlling a gasifier 152 according to an embodiment. The system 150 may include a combination feed injector 154, an optical device 156, a sensor 158, a gasifier monitor 160, and a gasifier controller 162. The combination feed injector 154 includes a preheat burner and a process feed injector. The combination feed injector 154 uses the pre-heat burner during a pre-heat mode to raise the temperature in the gasifier 152 to a suitable level for gasification. Once the temperature is high enough, the combination feed injector 154 transitions from the pre-heat burner to the process feed injector, which is used during a gasification mode of the gasifier 152. Thus, the combination feed injector 154 remains coupled to the gasifier 152 during both the pre-heat mode and the gasification mode. Unfortunately, manual inspection inside the gasifier 152 would require removal of the combination feed injector 154, which defeats the advantage of combining the pre-heat burner and the process feed injector into a single unit 154. In the illustrated embodiment, the optical device 156 and the sensor 158 cooperate with one another to obtain image data of an interior of the gasifier 152 without removal of the combination feed injector 154. The sensor 158 may be a UV sensor, IR sensor, visible light sensor, etc. or a combination thereof. Data from the sensor 158 may then be interpreted by the monitor 160 to determine operating conditions, slag buildup, refractory wear, and other parameters of the gasifier 152. Based on the sensed condition of the gasifier 152 the monitor 160 may send signals to the controller 162, which then controls the combination feed injector 154. For example, the controller 162 may adjust the combination feed injector 154 to improve the pre-heat mode, improve the gasification mode, reduce or prevent slag buildup, reduce or prevent refractory wear, and so forth.

The gasifier 152 defines a first layer 164 and a second layer 166. The first layer 164 may be described as an outer layer or pressure containing shell of the gasifier 152. The second layer 166 may be described as an inner layer or thermal protective liner. The second layer 166 is typically made of a refractory material (e.g., ceramics). The second layer 166 defines an interior combustion chamber 168 to facilitate the gasification process. Furthermore, the first and second layers 164 and 166 collectively define an inlet 170, an outlet portion 172, a viewing or monitoring port 174, and a dome-shaped portion 176.

The inlet 170 allows the combination feed injector 154 to insert fuel 178, fuel 180, air 181 and oxygen 182 into the combustion chamber 168. The inlet 170 may include multiple openings or a single opening, depending on the embodiment. Fuel 178 may be the same or different from the fuel 180. In some embodiments, fuel 178 may be a clean burning fuel (e.g., natural gas). This clean burning fuel may be used by the preheat burner to raise the temperature within chamber 168 prior to gasification operations or to maintain the temperature within chamber 168 between successive gasification operations. During gasification operations, inlet 170 may allow fuel 180 and oxygen 182 to enter the chamber 168. For example, the fuel 180 may be a carbonaceous feedstock, such as coal.

The outlet portion 172 allows syngas and other byproducts, such as slag 108, to exit the gasifier reaction chamber 168. The outlet portion 172 may define a cone shaped portion 184 and a throat 186. The gasification of fuel 180 may create slag 108 within the combustion chamber 168. Normally, slag 108 will either stick to a refractory wall 188 or run down the wall 188 and exit through the throat 186. The slag exiting the throat 186 may be cooled in the gasifier quench chamber, which is located below exit 172 but not shown in FIG. 2, and then collected by a lock hopper, also not shown, for periodic discharge from the gasifier. Unfortunately, certain conditions in the gasifier 152 may cause the slag to collect in the throat 186 due to insufficient flow of slag. Eventually, if the gasifier 152 operational conditions remain unchanged, then the slag may substantially or completely block the throat 186. If the throat 186 cannot be deslagged while the gasifier is hot, then a mechanical tool may be necessary to unplug the throat 186. The use of mechanical tools may dictate that the gasifier 152 be cooled to ambient temperature after which a mechanical drill, or similar device, is then used to remove the slag from the throat 186. Deslagging with mechanical tools can be very expensive in terms of lost time and production.

To prevent these kinds of deslagging operations, the disclosed system 150 detects slag buildup and other gasifier conditions without removal of the combination feed injector 154. The port 174 facilitates this by allowing the gasifier chamber 168 to be visually monitored without the removal of the combination feed injector 154. The port 174 is sized sufficiently to receive the optical device 156. The port 174 may be located on the dome shaped portion 176 of the gasifier 152 or elsewhere independent from the inlet 170 and combination feed injector 154. Placement of the optical device 156 on the dome shaped portion 176 may provide a suitable angle and field of view of the gasifier outlet portion 172. For example, the optical device 156 may be capable of a field of view 175 of approximately 20-90 degrees. The optical device 156 transmits an optical view of the interior of the gasifier 152 to the sensor 158, which then converts the optical view to image data collected by the gasifier monitor 160.

The optical device 156 may allow for continuous observation of the combustion chamber 168 during both pre-heat and gasification modes. This may allow the sensor(s) 158 to sense the conditions within the chamber 168 and the throat 186, thereby allowing real-time control of the gasifier to improve operation and reduce undesirable conditions (e.g., slag buildup and refractory wear). In the illustrated embodiment, sensor 158 senses electromagnetic radiation. For example, the sensor 158 may include devices that operate in the infrared, visible and/or ultraviolet regions of the electromagnetic spectrum. Moreover, the devices included in sensor 158 may be cameras, pyrometers or simple detectors.

The gasifier monitor 160 receives the image data from the sensor 158 using a data acquisition circuit or logic 190. The data acquisition circuit/logic 190 passes this information to a data processing circuit/logic 192 to process the data. After processing the data, it may then be transferred to the graphical display circuit/logic 194 for viewing on display 196 and interpretation by a technician. The technician upon interpreting the data may then determine whether to change conditions in the gasifier using the user input device 198. If the technician decides that change is necessary because of conditions within the gasifier 152, the user input may be delivered to the gasifier controller 162. In some embodiments, the gasifier monitor 160 may deliver the acquired, processed image data to the controller 162, which may automatically control operation of the gasifier 152 with or without user input. The change may involve adjusting a preheat control 200, an air control 201, an oxygen control 202, a first fuel control 204, and/or a second fuel control 206. For instance, if the image data indicates slag buildup or refractory wear, then the controller 162 may employ the pre-heat control 200 to adjust the pre-heat mode in the gasifier 152, the air control 201 to control the flow of air 181, the oxygen control 202 to control the flow of oxygen 182, the first fuel control 204 to control the flow of the fuel 178, and/or the second fuel control 206 to control the flow of the fuel 180. The various adjustments may alter the fuel-oxygen or fuel-to-air ratio, combustion temperature (in the case of preheat mode), gasification temperature, gasification byproducts, and other parameters that may increase or decrease slag buildup and refractory wear. Thus, in response to the monitored image data representative of internal conditions in the gasifier 152, the controller 162 may quickly respond to undesirable conditions and provide corrective actions without any downtime of the gasifier 152.

Figure 3:
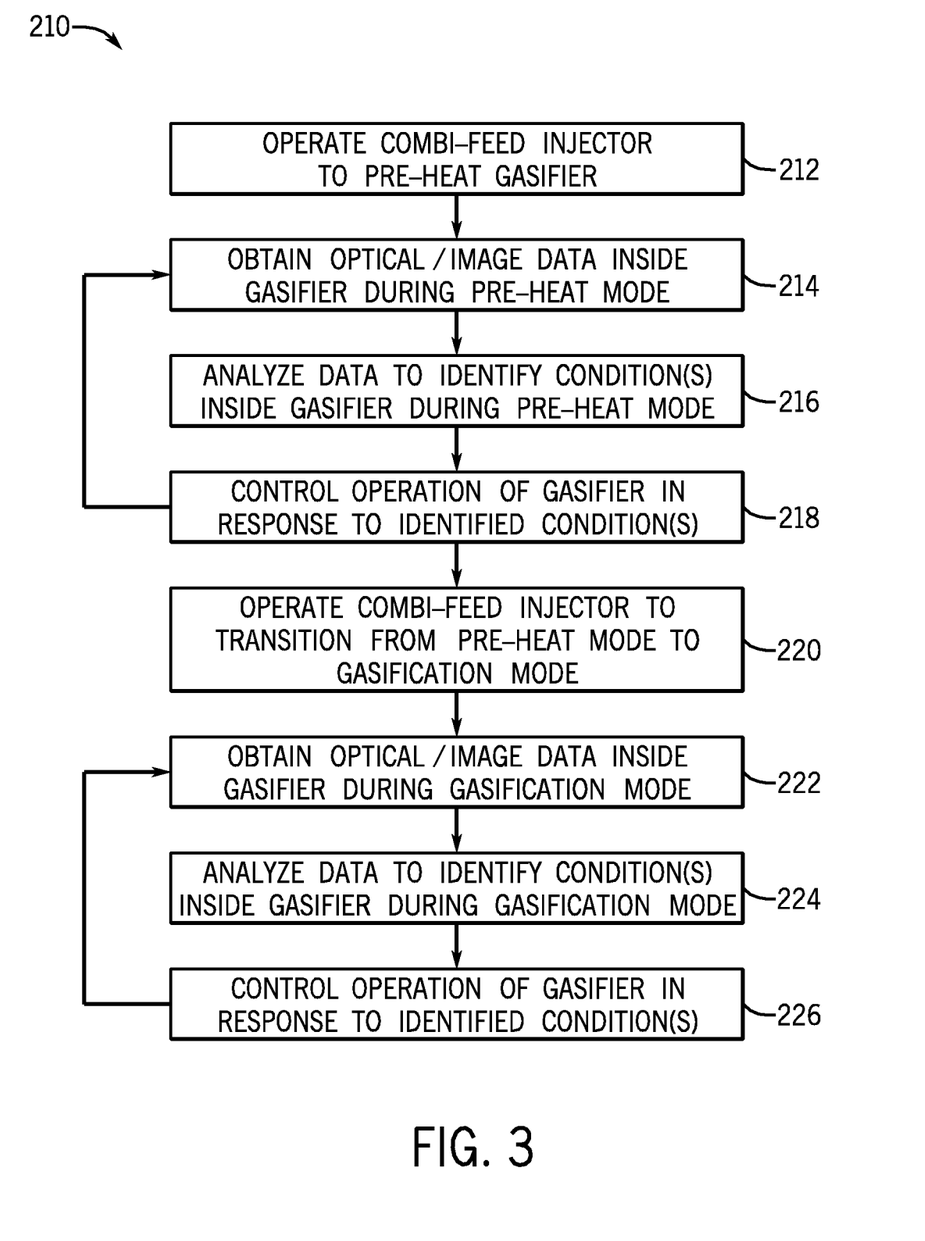
FIG. 3 is a flow chart illustrating an embodiment of a process for internally monitoring and controlling a gasifier during a transition from a pre-heat mode to a gasification mode.

FIG. 3 is a flow chart illustrating an embodiment of a process 210 for internally monitoring and controlling a gasifier 152 during a transition from a pre-heat mode to a gasification mode using the system 150 of FIG. 2. The process 210 may begin with the step of operating a combination feed injector 154 to preheat the gasifier 152 (block 212). As discussed above, a natural gas flame may be used to preheat the gasifier 152 so that the normal gasification fuel may immediately combust upon entering the combustion chamber 168. Next, the sensor(s) 158 (e.g., an IR sensor) may then begin obtaining infrared image data inside the gasifier 152 during the preheat mode (block 214). The infrared image data may then be analyzed to identify one or more conditions inside the gasifier during the preheat mode (block 216). For instance, the infrared image may indicate the temperature distribution, refractory wall condition, throat condition, and average temperature in the gasifier 152. The next step involves controlling operation of the gasifier 152 in response to the identified conditions (block 218). For instance, if the infrared image data indicates that the refractory material has not reached an appropriate temperature, then the preheat burner will remain on until a sufficient temperature has been reached. Alternatively, the UV sensor data may indicate that the preheat burner flame is not operating. In this case, the controller 218 may restart the pre-heat burner or output an alarm to notify a technician. During preheat mode the steps 214, 216, and 218 may be repeated to continuously monitor and control the preheat operation.

When the temperature is sufficiently high for normal gasifier operations, the process 210 proceeds to operate the combination feed injector 154 to transition from the preheat mode to a gasification mode (block 220). For example, the transition 220 may switch from air 181 and the preheat fuel 178 (e.g. natural gas) to oxygen 182 and the normal gasification fuel 180 (e.g., coal) or other carbonaceous feedstock. As appreciated, the fuel 178 used during the pre-heat mode does not undergo gasification, whereas the fuel 180 used during the gasification mode undergoes the gasification reactions to produce syngas. Upon transitioning, the process 210 obtains sensor/image data inside the gasifier 152 during the gasification mode (block 222). The sensor/image data may then be analyzed to identify conditions inside the gasifier 152 during gasification mode (block 224). For example, the light intensity or color in different regions of the image may be indicative of higher or lower temperatures in those regions. This in turn may be indicative of refractory wear, slag buildup, or normal conditions. In certain embodiments, the image data may be compared with baseline image data to facilitate detection of undesirable conditions. By further example, the sensor/image data may be analyzed to determine if the gasification reaction is optimal, or if conditions are less than optimal. The sensor/image data may represent the temperature distribution, which may be indicative of fuel/oxygen mixing, completeness of the reactions, and so forth. Based on this sensor/image data, the gasifier 152 may be controlled in response to the identified condition (block 226). For instance, the amount of fuel/air or fuel/oxygen may be increased or decreased to correct or adjust the condition. These adjustments may reduce or prevent slag buildup, refractory wear, or other undesirable conditions. These adjustments also may improve the efficiency of the gasification reactions to increase syngas output or optimize the syngas composition. It is understood that the gasification mode steps 222, 224, and 226 may be repeated to continuously monitor and control the gasification operations.

Figure 4:
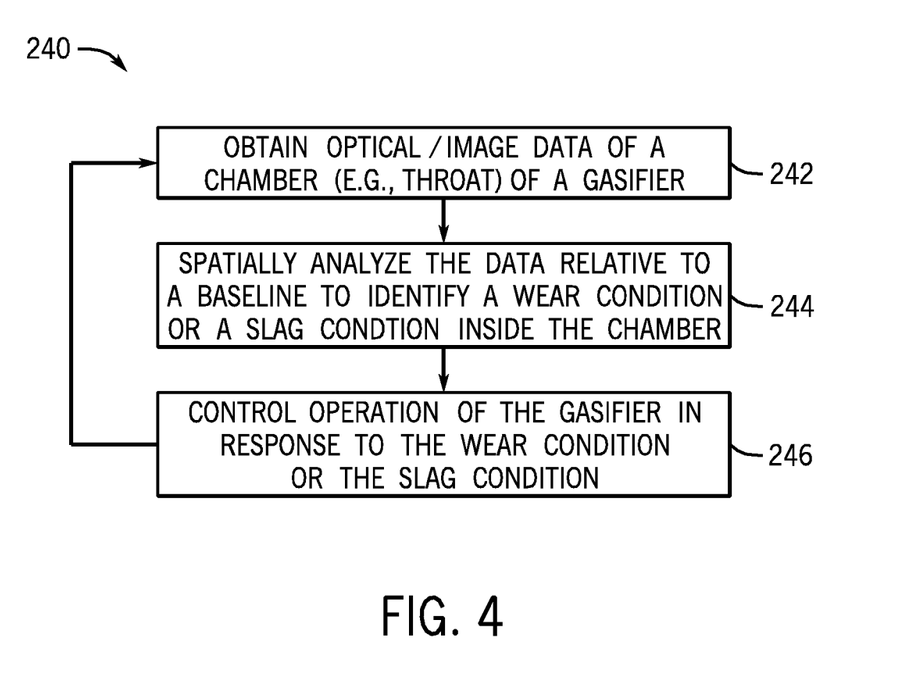
FIG. 4 is a flow chart illustrating an embodiment of a process for internally monitoring and controlling a gasifier based on image data analyzed to identify one or more conditions inside the gasifier.

FIG. 4 is a flow chart illustrating an embodiment of a process 240 for internally monitoring and controlling a gasifier 152 based on image data analyzed to identify one or more conditions inside the gasifier 152. The process 240 includes obtaining image data of the chamber 168 (e.g., outlet/throat) of the gasifier 152 (block 242). For example, the process 240 may obtain image data of the chamber 168 of the gasifier 152 to obtain a baseline. The baseline image data may represent a new or refurbished condition of the gasifier 152. The process 240 may also obtain the image data of the chamber 168 after or during operation of the gasifier 152. For example, the process 240 may continually monitor the interior chamber 168 of the gasifier 152 during pre-heat and gasification modes. The process 240 then spatially analyzes the image data relative to the baseline to determine changes in the gasifier 152, e.g., the throat 186 (block 244). For example, the spatial analysis comparison 244 between baseline and current image data may indicate refractory wear, slag buildup, or other changes in the geometry inside the chamber 168 of the gasifier 152. In particular, the spatial analysis comparison 244 may indicate refractory wear or slag buildup in the throat 186. The process 240 then controls operation of the gasifier 152 in response to the wear condition or the slag condition identified by the spatial analysis comparison (block 246). For example, the gasifier control 246 may adjust the airflow, the oxygen flow, the fuel flow, fuel/air ratio, the fuel/oxygen ratio, a steam flow, or other operational parameters to reduce or eliminate the identified condition. Specifically, the gasifier control 246 may reduce or limit slag buildup by lowering the gasifier temperature via lowering heat input from the pre-heat burner, or reducing the oxygen concentration by lowering the air/fuel or oxygen/fuel ratio to the pre-heat burner. Similar to the discussion above, steps 242, 244, and 246 may be repeated to continuously monitor and control the gasification operations.

Figures 5, 6:
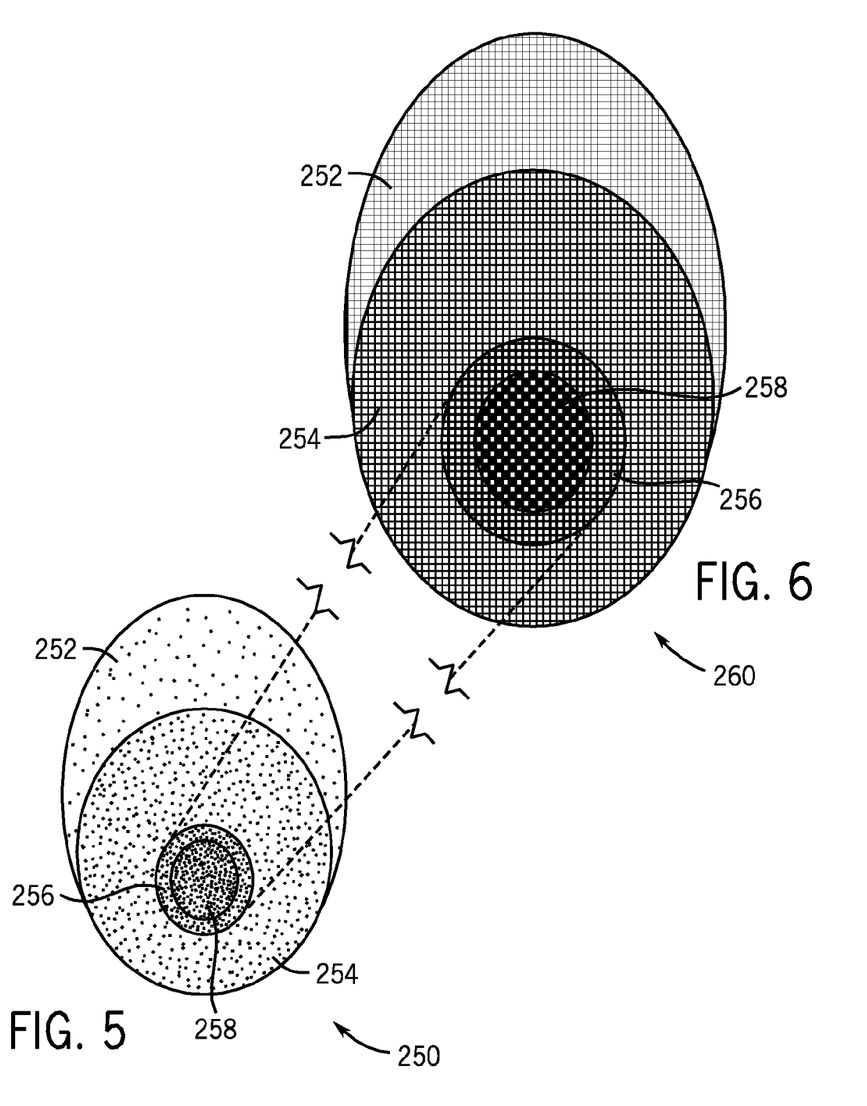
FIG. 5 is an exemplary view of an embodiment of image data representative of an interior of a gasifier.
FIG. 6 is an exemplary view of an embodiment of processed image data representative of an interior of a gasifier.

FIG. 5 is an exemplary view of the visual image (e.g., an image 250) that corresponds to the portion of the interior chamber 168 of the gasifier 152 as viewed by the optical device 156 and sensor 158, that is, image 250 represents the field of view of optical device 156 and sensor 158. In the illustrated embodiment, the image 250 represents four regions 252, 254, 256, and 258 of the interior chamber 168. The region 252 corresponds to a portion of the gasifier wall 188, region 254 corresponds to the cone shaped bottom 184, region 256 corresponds to the region of the cone shaped bottom 184 closest to the gasifier throat 186, and region 258 corresponds to the gasifier throat 186 and portions of the gasifier outlet 172 that are visible through the gasifier throat 186 from the vantage point of the optical device 156. The different shading of the regions illustrates the differences in temperatures. For instance, the region 252 and the majority of region 254 will have lighter shading due to the higher temperatures experienced by the wall 188 and the cone shaped bottom 184 of the gasifier 152. Region 258 will have a significantly lower temperature than regions 252 and 254, because region 258 corresponds with materials below the throat 186 that are not directly heated by the gasification reactions, and as a result have much darker shading. Region 256 correspondingly has intermediate shading, as it is the junction of two different thermal regions (i.e., the high temperatures of the gasifier chamber 168 and the cooler temperatures of the quench chamber located below the gasifier 152). The boundary between regions 256 and 258 generally defines the throat 186.

FIG. 6 is an exemplary view of an embodiment of processed image data (e.g., processed image 260) after processing of the image 250 of FIG. 5 by the data processing circuit/logic 192 of the gasifier monitor 160 of FIG. 2. As seen in FIG. 6 image 260 includes the same regions 252, 254, 256, and 258 of FIG. 5, but the image 260 is in digital form, such that each individual pixel of the digital image 260 represents a small, corresponding portion of image 250. The wavelength (or color) and the intensity of the incident radiation associated with each of the pixels can be converted by data processing circuit/logic 192 into a map of the spatial temperature distribution in the chamber 168 corresponding to image 250. As discussed above, the monitor 160 may obtain a baseline image 260 of a new or refurbished state of the gasifier 152, and then obtain real time operational images 260 of the gasifier 152 to evaluate any changes in the chamber 168 during operation. For example, the monitor 160 is able to spatially analyze the baseline and operational images 260 and determine whether the diameter of the throat 186 has grown or decreased in size. For instance, in the event of refractory wear, the diameter of the throat 186 will increase in size. This increase in size of the throat 186 will lead to an increase in size of the temperature region 258 and a decrease in size of the temperature region 254. In contrast, in the event that slag begins to plug the throat 186, the size of temperature region 258 will decrease in size and the size of temperature region 256 will increase in size. As the monitor 160 compares the baseline and operational images 260 and identifies spatial differences indicative of wear or slag buildup, the controller 162 may automatically adjust operational parameters of the gasifier 152 to reduce, remove, or prevent progress of the identified condition. The controller 162 also may generate alarms (e.g., audio, visual, or both) to alert a technician of the identified condition, and allow the technician to choose an appropriate remedial action. While only four regions are illustrated in the present embodiment, it is understood that additional embodiments may include more or less than four temperature regions that may be used in determining the status of the gasifier 152.

Figure 7:
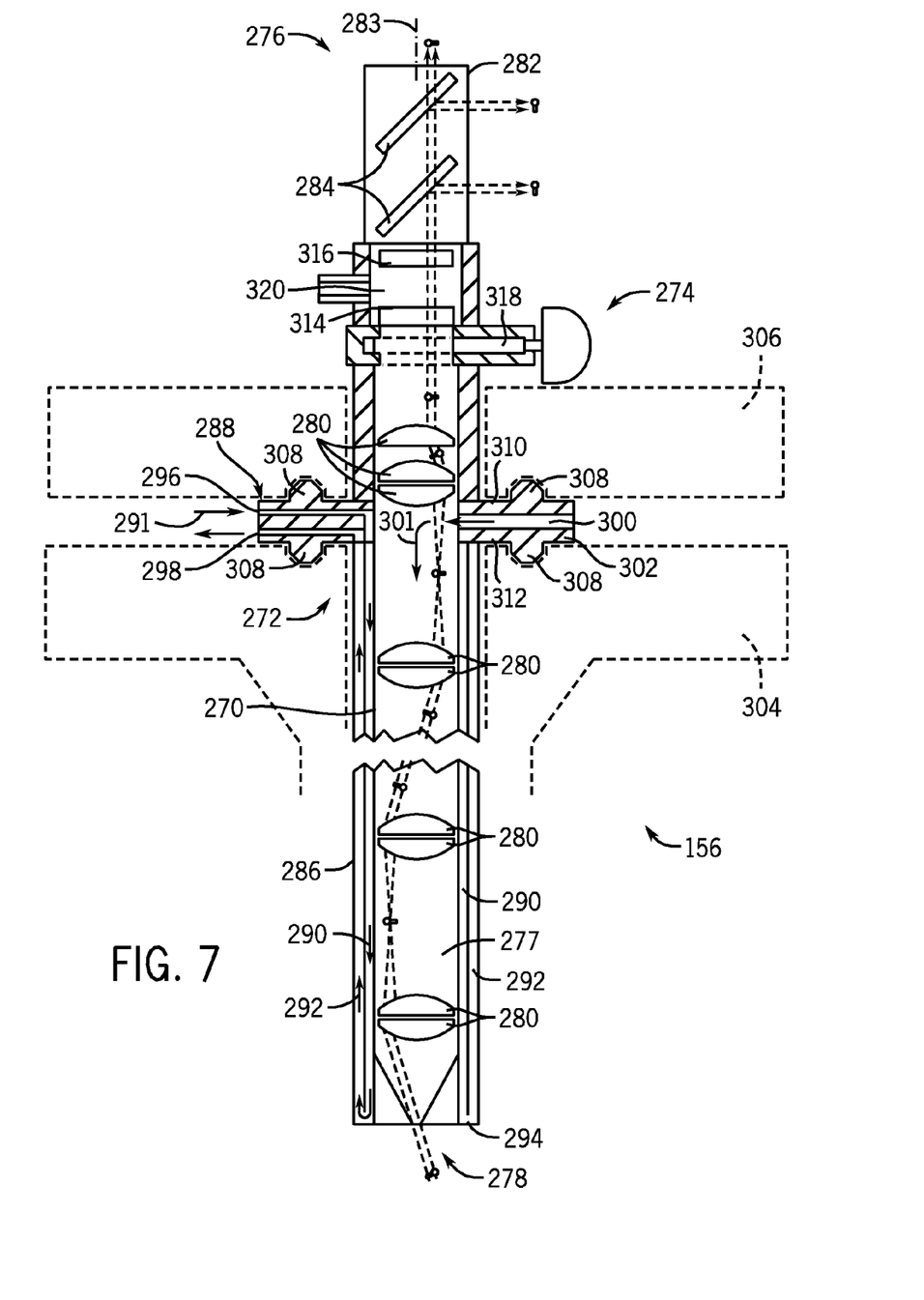
FIG. 7 is a cross-sectional view of an embodiment of an optical device for internally monitoring a gasifier during operation of the gasifier.

FIG. 7 is a cross-sectional view of an embodiment of an optical device 156 for internally monitoring the gasifier 152 during operation of the gasifier 152. The optical device 156 may be mounted onto the gasifier 152 through the port 174. This allows the sensor 158 (e.g., a visual camera, UV camera, IR camera, etc.) to inspect the chamber 168 of the gasifier 152 through the optical device 156. The optical device 156 may include an optical tube portion 270, cooling/mounting system 272, a pressure containment/safety system 274, and a beam splitter portion 276.

The optical tube portion 270 defines a hollow body 277, a pinhole tip 278, and transfer lenses 280. The transfer lenses 280 fit within the hollow body 277 of the optical tube portion 270 and transfer images of the gasifier 152 through the optical tube portion 270 to the beam splitter portion 276. While in the present embodiment nine transfer lenses are shown, other embodiments may include more or less than the nine transfer lenses shown in FIG. 7 Likewise, the shapes and orientations of the transfer lenses shown are for illustrative purposes, and other embodiments may include lenses of other shapes and orientations, as well as, optical fiber components.

The beam splitter portion 276 includes a housing 282 and beam splitters 284. The beam splitters 284 are held in place with the housing 276 at an angle relative to an axis 283. The beam splitters 284 create multiple images of the gasifier 152 chamber 186, allowing multiple sensors 158 to receive images of the gasifier 152. For example, the beam splitters 284 may send images to an IR sensor, a UV sensor, and/or a visual light sensor. While in the present embodiment two beam splitters are illustrated, other embodiments may include more or less than two beam splitters (e.g., 1 to 10).

The cooling/mounting system 272 is provided to protect the optical device from the internal temperatures and pressure of the gasifier 152. The cooling/mounting system 272 includes a cooling jacket 286 that surrounds the optical tube portion 270 and a mounting portion 288. The cooling jacket defines a cooling path 290 and an exit path 292. The cooling path 290 directs a cooling fluid 291 (e.g., water, coolant etc.) around the optical tube portion 270 to an end portion 294 of the cooling jacket 286. The end portion 294 of the cooling jacket 286 transitions the cooling path 290 into the exit path 292. The mounting portion 288 defines a cooling fluid entrance 296 and a cooling fluid exit 298. This allows cooling fluid to enter and exit the cooling jacket 286. The cooling fluid entrance and exit 296 and 298 may be connected to reservoirs that supply cooling fluid, and that collect the cooling fluid upon exiting the cooling jacket 286. The coolant also may be chilled by a cooling system, such as a cooling tower, refrigeration cycle, or heat exchanger.

The mounting portion 288 may also define a gas entrance 300 that allows shielding gas 301 to enter the optical tube portion 270. This gas entrance 300 may allow shielding gas (e.g., nitrogen) to enter the optical tube portion 270, and flow in the hollow body 277 towards the pinhole 278. Upon reaching the pinhole 278, the gas 301 exits the optical tube portion 270 and enters the gasifier 152. In this manner, the shielding gas 301 ensures that the pinhole 278 remains clear of ash, debris, slag etc. By keeping the pinhole 278 clear of obstructions during and after gasification, optical images may be transferred to the sensor(s) 158 without requiring the removal of the optical device 156 for cleaning.

In order to mount the optical device 156 to the gasifier 152, the mounting portion 288 may include a mounting ring 302 that is perpendicular to the optical tube portion 270. The ring 302 may be annular in shape and wrap completely around the optical tube portion 270. The ring 302 is designed to fit between a gasifier nozzle flange 304 and an instrument blind flange 306. When flange 304 and flange 306, which may be conventional bolted flanges, are bolted together, the optical device 156 may be fixed to the gasifier 152. In certain embodiments, the optical device 156 may be welded, bolted, or fastened to the gasifier 152 at the port 174 in a sealed manner. In some embodiments, the mounting ring 302 may include protrusions 308 (e.g., annular) that extend from a top side 310 and a bottom side 312. These protrusions 308 may block lateral movement and seal the optical device 156 when attached to the gasifier 152 using flange 304 and flange 306.

The pressure containment/safety system 274 is configured to provide an optically transparent means to contain the pressure inside gasifier 152 during gasification operations and to block reactants from escaping the gasifier 152 in the event the pressure containment fails. In the present embodiment, the safety system 274 includes a first sight glass 314, a second sight glass 316, a safety valve 318, and a pressurized gas chamber 320. The sight glasses 314 and 316 provide a double seal mechanism, which allows optical images to pass from the lenses 280 to the beam splitters 284. If one of the sight glasses 314 or 316 fails, then the safety system 274 is designed to close the safety valve 318. The system operates by sensing a loss in pressure of the pressurized gas in chamber 320. If one or both of the safety glasses 314 or 316 break, then the pressurized gas in chamber 320 is able to escape resulting in a loss of pressure. The loss in pressure may then be sensed by the controller 162, which then shuts the safety valve 318, preventing heat and gasifier reactants from escaping through the optical device 156. As appreciated, the optical device 156 of FIG. 7 is configured to mount in the port 174 of the gasifier 152 during any stage of operation of the gasifier 152. Likewise, it should be appreciated that not all of the details needed to practically implement the optical device 156 are shown in FIG. 7.

Figure 8:
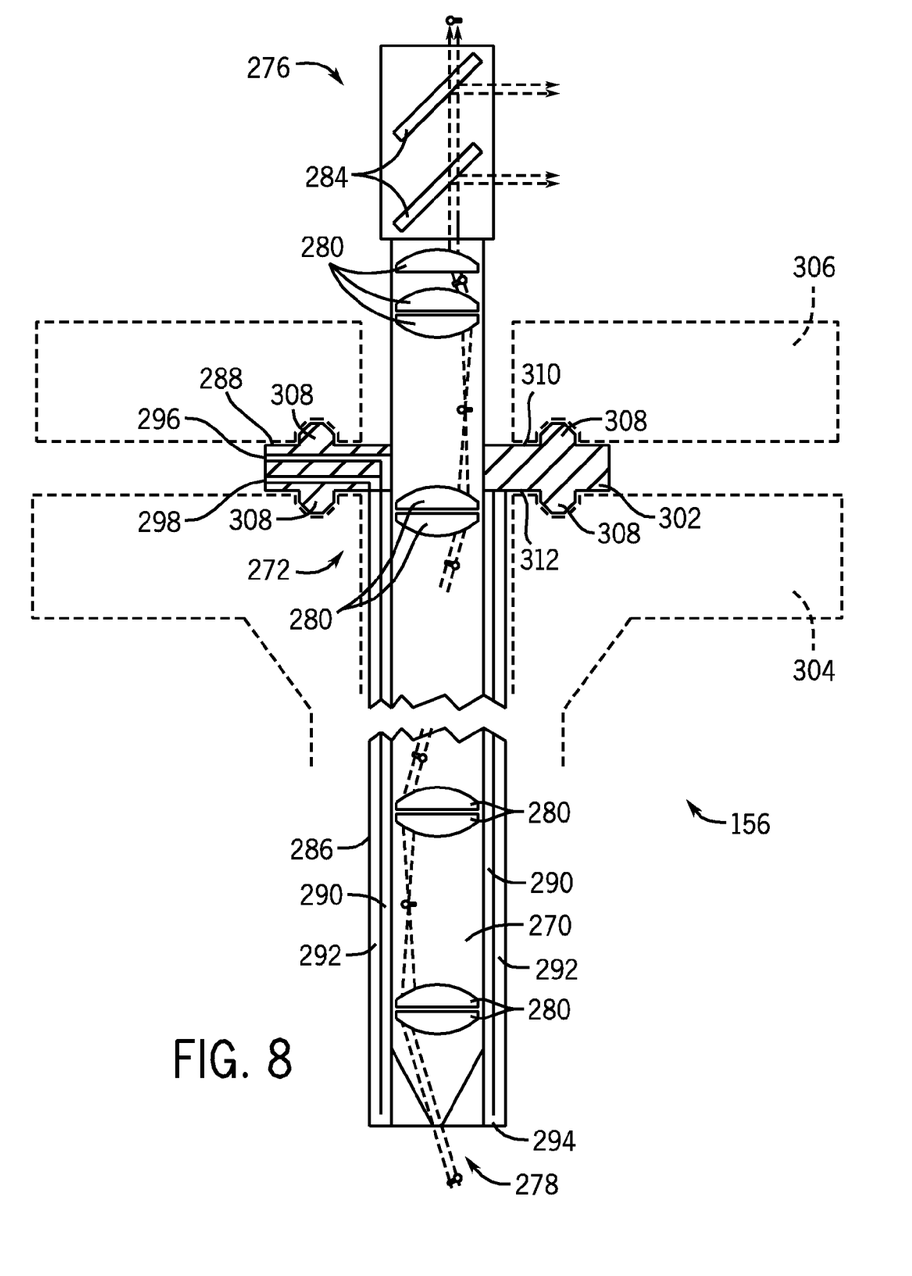
FIG. 8 is a cross-sectional view of an embodiment of an optical device for internally inspecting a gasifier during downtime of the gasifier.

In still other embodiments, it may be preferable to have a removable optical device. FIG. 8 is a cross-sectional view of an embodiment of an optical device 156 that may be removably mounted to the gasifier 152. The removable optical device 156 of FIG. 8 shares many of the same features as the permanently mounted optical device 156 of FIG. 7. For instance, the illustrated optical device 156 may include the optical tube portion 270, cooling/mounting system 272 surrounding the optical tube portion 270, and beam splitter portion 276. Unlike the optical device 156 of FIG. 7, the illustrated optical device 156 may not include the pressure containment/safety system 274 or the use of shielding gas to clear the pinhole 278 of obstructions. For example, the illustrated optical device 156 may only be inserted when the pre-heat burner is in operation and then removed when gasification is initiated. As discussed above, the pre-heat burner may use a clean flame such as a natural gas flame. When the optical device 156, is exposed to a clean flame there may not be a need to keep the pinhole 278 clear of obstruction. Furthermore, there may not be a need for a pressure containment/safety device, because the optical device 156 is removed before the higher pressures characteristic of gasification operations prevail.

Technical effects of the disclosed embodiments include the ability to monitor the interior of a gasification chamber while using combination feed injectors, that is, feed injectors which combine the functions of preheat burner and process feed injector into one unit. As discussed above, a combination feed injector, or similar device, prevents direct observation of the gasifier chamber, because the injector remains installed in the top of the gasifier. The disclosed embodiments enable visual monitoring of the interior chamber of the gasifier without having to remove the combination feed injector. As a result, the interior chamber may be monitored during operation of the gasifier to identify slag buildup, refractory wear, and operational conditions inside the gasifier. In particular, the disclosed embodiments compare a baseline image with operational images of the interior chamber of the gasifier to identify spatial changes, which are indicative of wear or slag buildup. In turn, the disclosed embodiments may provide control functions responsive to the identified conditions based on image comparisons. In this manner, the disclosed embodiments increase the life of the gasifier, increase gasifier performance, and reduce gasifier downtime.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a gasifier comprising a wall defining a chamber, an inlet, an outlet, and a port;
    a combination feed injector coupled to the inlet, wherein the combination feed injector is configured to inject a first fuel and air or oxygen into the chamber to preheat the gasifier, and the combination feed injector is configured to inject a second fuel and oxygen into the gasifier after preheating to gasify the second fuel;
    an optical device coupled to the port;
    a sensor coupled to the optical device; and
    a monitoring system coupled to the sensor, wherein the monitoring system is configured to acquire image data that represents a portion of the gasifier from the sensor, process the image data, compare the image data to baseline image data of a throat, and provide an output representative of a condition of the gasifier based on the comparison of the image data to the baseline image data, wherein the image data indicates a change in a size of the outlet relative to the baseline image and the change in size is indicative of a wear condition or a slag condition.

2. The system of claim 1, wherein the optical device remains coupled to the port during a preheat process of the gasifier, and wherein the monitoring system is configured to acquire the image data during the preheat process.

3. The system of claim 1, wherein the optical device remains coupled to the port during a preheat and a gasification process of the gasifier, and wherein the monitoring system is configured to acquire the image data during the preheat and the gasification process.

4. The system of claim 1, wherein the optical device is coupled to a dome of the gasifier adjacent the inlet, and the optical device is angled toward a throat having the outlet.

5. The system of claim 1, wherein the image data is representative of a combination of the wear condition and the slag condition, along the outlet.

6. The system of claim 1, comprising a display device configured to display a graphical or a visual representation of the output.

7. The system of claim 1, comprising a controller responsive to the output from the monitoring system, wherein the controller is configured to adjust flow of the first fuel, the second fuel, the oxygen, the air or a combination thereof, in response to the output.

8. The system of claim 1, wherein the optical device comprises a hollow body, a plurality of lenses disposed inside the hollow body, at least one beam splitter, and a fluid cooling jacket disposed about the hollow body.

9. The system of claim 1, wherein the optical device comprises a hollow body, a plurality of lenses disposed inside the hollow body, a plurality of beam splitters, a double sight glass disposed between the plurality of lenses and the plurality of beam splitters, a safety valve, a fluid cooling jacket disposed about the hollow body, and a shielding gas port.

10. The system of claim 1, wherein the optical device rests within the port.

11. The system of claim 1, wherein the sensor is outside of the chamber.

12. A system, comprising:
- a gasifier monitor configured to acquire image data that represents a portion of a gasifier from a sensor connected to an optical device directed into a chamber of the gasifier, process the image data, compare the image data to baseline image data of the gasifier, and provide an output representative of a condition of the gasifier based on the comparison of the image data to the baseline image data, wherein the image data indicates a change in a size of an outlet relative to the baseline image and the change in size is indicative of a wear condition or a slag condition; and
- a gasifier controller responsive to the output from the gasifier monitor, wherein the gasifier controller is configured to adjust at least one of a fuel flow or an oxygen flow or an air flow into the gasifier in response to the output.

13. The system of claim 12, comprising the optical device having a hollow body, a plurality of lenses disposed inside the hollow body, a fluid cooling jacket disposed about the hollow body, and a shielding gas port.

14. The system of claim 12, wherein the gasifier monitor is configured to process the image data to obtain a analysis of variations in at least one of light intensity or color or wavelength representative of temperature levels inside the chamber, and the gasifier monitor is configured to use the analysis to identify wear or slag buildup.

15. The system of claim 12, wherein the gasifier monitor is configured to provide the output representative of a temperature, a flame, an operational mode, and a throat condition in the chamber.

16. The system of claim 12, wherein the image data is representative of at least one of a wear condition or a slag condition inside the chamber, and the gasifier controller is configured to adjust at least one of the fuel flow or the oxygen flow or the air flow to at least reduce progress of the wear condition or the slag condition.

17. The system of claim 12, wherein the gasification controller is configured to control injection of a first fuel and air or oxygen into the chamber to preheat the gasifier, the gasification controller is configured to control injection of a second fuel and air into the gasifier after preheating to gasify the second fuel, and the gasification controller is responsive to the output from the gasifier monitor to adjust flow of the first fuel, the second fuel, the oxygen, the air or a combination thereof, in response to the output.

18. The system of claim 17, comprising the gasifier coupled to the gasifier monitor and the gasifier controller.

19. A method, comprising:
- obtaining an image of a chamber of a gasifier; and
- analyzing the image relative to a baseline image to identify a wear condition or a slag condition inside the chamber, wherein the image indicates a change in a size of an outlet relative to the baseline image.

20. The method of claim 19, comprising controlling operation of the gasifier in response to the wear condition or the slag condition.

21. The method of claim 19, wherein analyzing comprises identifying an inner boundary of the chamber based on variations in at least one of light intensity or color or wavelength representative of temperature levels inside the chamber.

22. The method of claim 19, comprising adjusting at least one of a fuel flow or an oxygen flow or an air flow into the gasifier in response to an output representative of the wear condition or the slag condition.

23. The method of claim 19, comprising:
- controlling injection of a first fuel and air or oxygen into the chamber to preheat the gasifier;
- controlling injection of a second fuel and air into the gasifier after preheating to gasify the second fuel; and
- adjusting flow of the first fuel, the second fuel, the oxygen, the air, or a combination thereof, in response to an output representative of the wear condition or the slag condition.

* * * * *